(12) United States Patent
Lee et al.

(10) Patent No.: US 10,723,108 B2
(45) Date of Patent: Jul. 28, 2020

(54) MULTILAYER FILM AND RELATED MATERIALS AND METHODS

(71) Applicant: Dow Global Technologies LLC, Midland, MI (US)

(72) Inventors: Jong Young Lee, Sugarland, TX (US); Yijian Lin, Pearland, TX (US); Rajen M. Patel, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 257 days.

(21) Appl. No.: 15/521,174

(22) PCT Filed: Oct. 23, 2015

(86) PCT No.: PCT/US2015/057136
§ 371 (c)(1),
(2) Date: Apr. 21, 2017

(87) PCT Pub. No.: WO2016/069406
PCT Pub. Date: May 6, 2016

(65) Prior Publication Data
US 2017/0326853 A1 Nov. 16, 2017

Related U.S. Application Data

(60) Provisional application No. 62/072,637, filed on Oct. 30, 2014.

(51) Int. Cl.
*B32B 7/02* (2019.01)
*B32B 27/32* (2006.01)
(Continued)

(52) U.S. Cl.
CPC ............. *B32B 27/32* (2013.01); *B32B 27/08* (2013.01); *B32B 37/08* (2013.01); *B32B 37/15* (2013.01);
(Continued)

(58) Field of Classification Search
CPC .................................................... B32B 27/32
See application file for complete search history.

(56) References Cited

U.S. PATENT DOCUMENTS 3,318,538 A 5/1967 Needham
5,272,236 A 12/1993 Lai et al.
(Continued)

FOREIGN PATENT DOCUMENTS

EP 1022131 A1 7/2000
JP H08230121 A 9/1996
(Continued)

OTHER PUBLICATIONS

International Search Report and Written Opinion for International Application No. PCT/US2015/057136, dated Jan. 18, 2016 (10 pages).
(Continued)

*Primary Examiner* — Maria V Ewald
*Assistant Examiner* — Zachary M Davis
(74) *Attorney, Agent, or Firm* — Kagan Binder, PLLC

(57) ABSTRACT

Embodiments disclosed herein include multilayer films having at least an outer layer that includes 1) polyethylene elastomer and 2) ULDPE or VLDPE and that has a purge fraction greater than 20 percent as determined by Crystallization Elution Fractionation (CEF) test method. Embodiments disclosed herein also include related compositions to make such films and methods of making such films. The ULDPE or VLDPE can be made via Ziegler-Natta catalyst reaction techniques to provide the desired purge fraction.

8 Claims, 1 Drawing Sheet

(51) Int. Cl.
  *B32B 27/08* (2006.01)
  *B32B 37/08* (2006.01)
  *B32B 37/15* (2006.01)

(52) U.S. Cl.
  CPC ..... *B32B 2307/72* (2013.01); *B32B 2323/046* (2013.01)

(56) References Cited

U.S. PATENT DOCUMENTS

| | | |
|---|---|---|
| 5,272,272 A | 12/1993 | Nofre et al. |
| 6,100,341 A | 8/2000 | Friedman |
| 6,111,019 A | 8/2000 | Arjunan et al. |
| 6,486,284 B1 | 11/2002 | Karande et al. |
| 6,521,338 B1 | 2/2003 | Maka |
| 8,372,931 B2 | 2/2013 | Hermel-Davidock et al. |
| 2008/0038571 A1 | 2/2008 | Klitzmiller et al. |
| 2008/0176981 A1 | 7/2008 | Biscoglio et al. |
| 2011/0311792 A1* | 12/2011 | Batra .............. B32B 27/08 428/213 |

FOREIGN PATENT DOCUMENTS

| | | |
|---|---|---|
| JP | 2010280749 A | 12/2010 |
| JP | 2013-534948 A | 9/2013 |
| WO | 96/29203 A2 | 9/1996 |
| WO | 2011/159648 A1 | 12/2011 |
| WO | 2013/081742 A1 | 6/2013 |

OTHER PUBLICATIONS

Translation of Decision to Grant for Japanese Counterpart Application No. 2017-522389, dated Jan. 28, 2020 (2 pages).

* cited by examiner

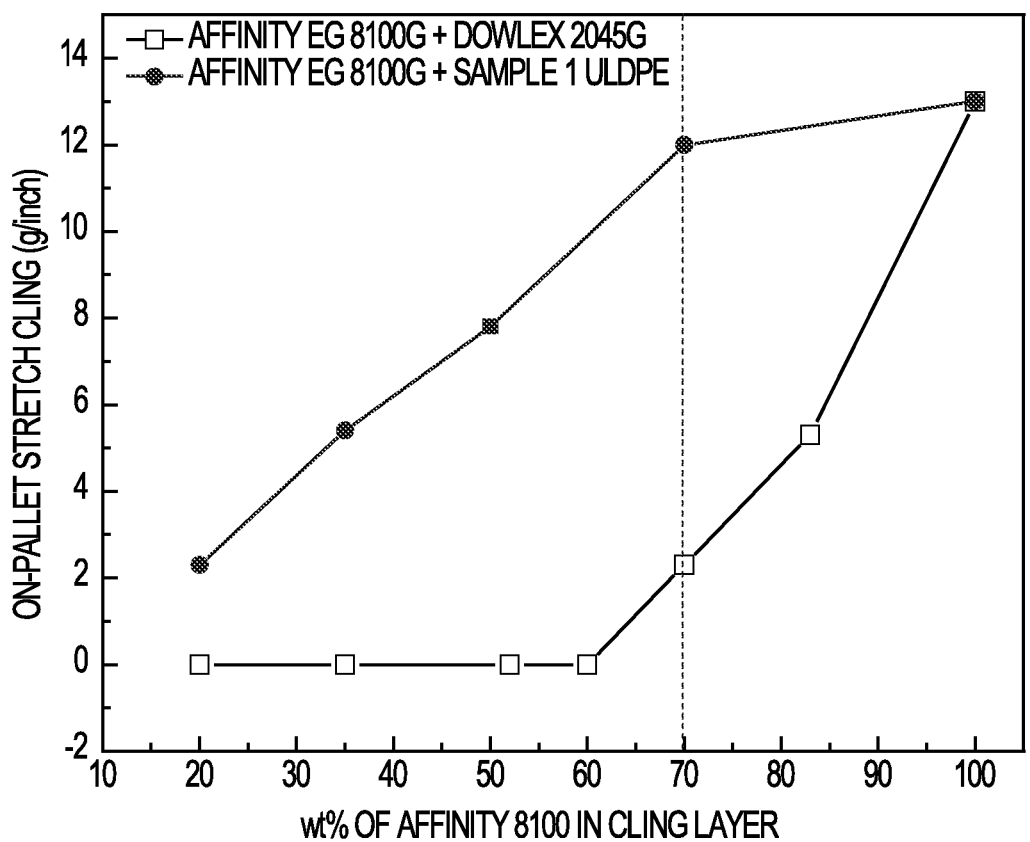

MULTILAYER FILM AND RELATED MATERIALS AND METHODS

PRIORITY CLAIM

This application claims the benefit of U.S. Provisional Patent Application Ser. No. 62/072,637 filed Oct. 30, 2014, entitled MULTILAYER FILM AND RELATED MATERIALS AND METHODS, the disclosure of which is incorporated herein by reference.

TECHNICAL FIELD

Embodiments of the present disclosure relate to multilayer films that have at least two layers. More particularly, to multilayer films that have at least an outer layer that includes 1) polyethylene elastomer and 2) ULDPE or VLDPE that has a purge fraction greater than 20 percent as determined by Crystallization Elution Fractionation (CEF) test method. The ULDPE or VLDPE can be made via Ziegler-Natta catalyst reaction techniques to provide the desired purge fraction.

BACKGROUND

Multilayer films can include films, such as, blown films. Exemplary multilayer blown films may include silage wrap, stretch wrap, and surface protective films. Oftentimes, such films include at least one layer (e.g., a cling layer) that has a sufficient level of tack such that the film can releasably adhere to itself and/or an article that is wrapped with the film.

Additives, such as polyisobutylene (PIB), may be incorporated into a cling layer to improve the tack of the cling layer. However, films that include such additives can have one or more drawbacks such as 1) being excessively noisy when unwound from a film-roll when utilized on a high speed wrapping machine, 2) having to be aged for a period of time so that the additive migrates to the surface of the film (i.e., blooms) during the aging period, 3) contaminating process equipment, and 4) causing two-sided cling when one-sided cling is desired. In addition, such additives can cause undue handling issues. For example, such additives can be in liquid form and drip to an undue degree from process equipment, etc.

Cling layers may also be made out of materials, such as polyethylene elastomers. While such materials can provide very desirable cling properties to a film, such materials can be relatively very expensive and/or can be difficult to process with blown film techniques when used at relatively high levels (e.g., greater than 90% by weight of a layer) because of their tackiness.

Accordingly, there is a desire to provide multilayer films having improved properties, such as, cling and/or low noise, while being cost-effective and/or relatively easy to fabricate using blown film techniques.

SUMMARY

Disclosed in embodiments herein are multilayer films. The multilayer films have a cling layer that includes 1) a polyethylene elastomer and 2) ultra-low density polyethylene polymer (ULDPE) and/or very low density polyethylene polymer (VLDPE), having a purge fraction greater than 20 percent as determined by Crystallization Elution Fractionation (CEF) test method. When incorporated into a cling layer formulation in combination with a polyethylene (PE) elastomer, ULDPE or VLDPE having a purge fraction greater than 20 percent can provide similar or even better cling in the cling layer as compared to a cling layer having a higher level of PE elastomer and no ULDPE or VLDPE polymer having a purge fraction greater than 20 percent. Reducing the amount of PE elastomer in a cling layer to provide desired cling properties can be advantageous as PE elastomer can be relatively expensive and/or can be difficult to process with blown film techniques when used at relatively high levels (e.g., greater than 90% by weight of a layer) because of its tackiness. Further, including one or more additives such as polyisobutylene (PIB) can be avoided. Not including such additives can be advantageous as such additives are sometimes subjected to a time consuming aging period so that the additive can migrate to the surface of the film (i.e., bloom): can be in liquid form and drip to an undue degree from process equipment, etc.: contaminate process equipment; cause an undue amount of noise when unrolling a roll of film; and/or cause two-sided cling when not desired.

Also disclosed in embodiments herein are multilayer films that include:
a cling layer including:
a polyethylene elastomer including a copolymer of ethylene and at least one comonomer selected from the group consisting of $C_3$-$C_{20}$ α-olefins, wherein the copolymer of ethylene has a density in the range 0.855 to 0.890 grams/cm$^3$ and a melt index ($I_2$) in the range of 0.1 to 30 grams/10 minutes; and
a polyethylene polymer chosen from an ultra-low density polyethylene polymer, a very low density polyethylene polymer, and combinations thereof, wherein the polyethylene polymer has a density in the range 0.885 to 0.915 grams/cm$^3$, a melt index ($I_2$) in the range of 0.1 to 30 grams/10 minutes, and a purge fraction greater than 20 percent as determined by Crystallization Elution Fractionation (CEF) test method; and a release layer.

Further disclosed in embodiments herein are compositions that include: a polyethylene elastomer including a copolymer of ethylene and at least one comonomer selected from the group consisting of $C_3$-$C_{20}$ α-olefins, wherein the copolymer of ethylene has a density in the range 0.855 to 0.890 grams/cm$^3$ and a melt index ($I_2$) in the range of 0.1 to 30 grams/10 minutes; and a polyethylene polymer chosen from an ultra-low density polyethylene polymer, a very low density polyethylene polymer, and combinations thereof, wherein the polyethylene polymer has a density in the range 0.885 to 0.915 grams/cm$^3$, a melt index ($I_2$) in the range of 0.1 to 30 grams/10 minutes, and a purge fraction greater than 20 percent as determined by Crystallization Elution Fractionation (CEF) test method.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawing.

It is to be understood that both the foregoing and the following description describe various embodiments and are intended to provide an overview or framework for understanding the nature and character of the claimed subject matter. The accompanying drawing is included to provide a further understanding of the various embodiments, and are incorporated into and constitute a part of this specification. The drawing illustrates the various embodiments described herein, and together with the description serves to explain the principles and operations of the claimed subject matter.

BRIEF DESCRIPTION OF THE DRAWINGS

FIG. 1 graphically depicts a comparison of "On-Pallet Stretch Cling" for two different formulations of cling layers from Table 2 in Example 1.

DETAILED DESCRIPTION

Reference will now made in detail to embodiments of multilayer films and materials used to make such films. A multilayer film includes at least two layers in contact. Optionally, one or more additional layers can be included between the two layers, which would then be two outer layers. An example of a multilayer film including at least two layers is a blown stretch film. A blown stretch film can include a cling layer as one outer layer and a release layer as the other outer layer. As used herein, a "cling" layer refers to an outer layer of a multilayer film that has a tack level that is high enough to allow the cling layer (and film) to releasably adhere to an article being wrapped and/or to the release layer of the film, while low enough to allow the film to be removed from the article, or removed from a roll containing the wrap. Also, as used herein, a "release" layer refers to an outer layer of a multilayer film that is opposite the cling layer and allows a "cling" layer to releasably adhere to said release layer. Desirably, a release layer provides a lesser amount of adhesion to the cling layer such that the film may be unrolled from a spool or other type roll without undue force or without the film breaking during the unrolling process.

An example of an additional layer between the cling layer and the release layer is referred to as a core layer. A core layer refers to a layer directly or indirectly contact with outer layers such as the cling layer and the release layer.

Each layer of such a multilayer film can be individually formulated; e.g., a polyethylene resin can be used in each layer and have the same or different chemical composition, density, melt index, thickness, etc., depending upon the desired properties of the film.

Resins for use in multilayers films as described herein can be characterized by a variety of parameters including one or more of melt index ($I_2$), density, molecular weight distribution ($M_w/M_n$), purge fraction as determined by the Crystallization Elution Fractionation (CEF) test method, Differential Scanning Calorimetery (DSC) and the like.

Melt index ($I_2$) can be measured in accordance with ASTM D-1238 (condition 190° C./2.16 kg).

Density can be measured in accordance with ASTM D-792.

Molecular weight distribution, or polydispersity, can be described as the ratio of weight average molecular weight ($M_w$) to number average molecular weight ($M_n$) (i.e., $M_w/M_n$) can be measured directly, e.g., by gel permeation chromatography techniques, or by measuring $I_{10}/I_2$ ratio, as described in ASTM D-1238. "$I_{10}$" is measured in accordance with ASTM D-1238 (condition 190° C./10 kg (formerly known as "Condition (E)"). "$I_2$" is measured as described above. For linear polyolefins, especially linear polyethylene, as $M_w/M_n$ increases, $I_{10}/I_2$ can also increase.

The Crystallization Elution Fractionation (CEF) test method is conducted according to the method described in Monrabal et al, Macromol. Symp. 257, 71-79 (2007), which is incorporated herein by reference. The CEF instrument is equipped with an IR-4 detector (such as that sold commercially from PolymerChar, Spain) and a two angle light scattering detector Model 2040 (such as those sold commercially from Precision Detectors). The IR-4 detector operates in the compositional mode with two filters: C006 and B057. A 10 micron guard column of 50 mm×4.6 mm (such as that sold commercially from PolymerLabs) is installed before the IR-4 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for about two hours before use. Eight hundred milligrams of BHT and five grams of silica gel are added to two liters of ODCB. ODCB containing BHT and silica gel is hereinafter referred to as "ODCB-m." ODCB-m is sparged with dried nitrogen ($N_2$) for one hour before use. Dried nitrogen is obtained by passing nitrogen at <90 psig over $CaCO_3$ and 5 Å molecular sieves. A sample solution is prepared by, using the autosampler, dissolving a polymer sample in ODCB-m at 4 mg/ml under shaking at 160° C. for 2 hours. 300 µL of the sample solution is injected into the column. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 mL/min. The flow rate during elution is 0.50 mL/min. The IR-4 signal data is collected at one data point/second.

The CEF column is packed with glass beads at 125 µm±6% (such as those commercially available from MO-SCI Specialty Products) with ⅛ inch stainless tubing according to U.S. 2011/0015346 A1. The internal liquid volume of the CEF column is between 2.1 mL and 2.3 mL. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 30.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931. The purge fraction (PF) of the materials eluting in the elution temperature range lower than 34.0° C., PF, is defined as the integral of the IR-4 chromatogram (baseline subtracted measurement channel) in the elution temperature ranging from 25.5 to 34.0° C. divided by the total integral from 25.5 to 118.0° C. according to the follow equation:

$$PF = \frac{\int_{25.5}^{34.0} IRdT}{\int_{25.5}^{118} IRdT} \times 100\%$$

where T is the elution temperature (from the calibration discussed above).

A linear baseline is calculated by selecting two data points: one before the polymer elutes, usually at a temperature of 25.5° C., and another one after the polymer elutes, usually at 18° C. For each data point, the detector signal is subtracted from the baseline before integration.

Differential Scanning Calorimetery (DSC) can be measured using a TA DSC Q1000. Baseline calibration can be performed by using the calibration wizard in the software. First, a baseline can be obtained by heating the cell from −80° C. to 280° C. without any sample in the aluminum DSC pan. After that, sapphire standards are used according to the instructions in the wizard. Then about 1-2 mg of a fresh indium sample was analyzed by heating the sample to 180° C., cooling the sample to 120° C. at a cooling rate of 10° C./imin followed by keeping the sample isothermally at 120° C. for 1 min, followed by heating the sample from 120° C. to 180° C. at a heating rate of 10° C./min. The heat of fusion and the onset of melting of the indium sample can be determined and checked to be within 0.5° C. from 156.6° C. for the onset of melting and within 0.5 J/g from 28.71 J/g for the heat of fusion. Then deionized water can be analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./imin. The onset of melting is determined and checked to be within 0.5° C. from 0° C.

Samples of polymer are pressed into a thin film at a temperature of 177° F. About 5 to 8 mg of sample is weighed out and placed in a DSC pan. A lid is crimped on the pan to ensure a closed atmosphere. The sample pan is placed in the DSC cell and then heated at a high rate of about 100° C./min to a temperature of about 30° C. above the polymer melt temperature. The sample is kept at this temperature for 5 minutes. Then the sample is cooled at a rate of 10° C./min to −40° C., and kept isothermally at that temperature for 5 minutes. Consequently the sample is heated at a rate of 10° C./min until melting is complete. The resulting enthalpy curves were analyzed to obtain the heat of fusion.

Multilayer films as described herein can be characterized by a variety of parameters including one or more of "On-pallet stretch cling," noise, and the like.

On-pallet stretch cling (for stretch cling performance) can be measured by Lantech SHS test equipment. The test consists of stretching the film at 200% at a constant F2 of 8 lbs. for 6 wraps with the turntable running at a rate of 10 rpm. The end of the film is then attached to a load cell which measures the amount of force, in grams, needed to pull the fill off the drum.

The noise level of the films during unwinding can be determined by the Highlight Stretch Film Test Stand (from Highlight Industries). When the film is unwound from the sample roll, a sensor, attached to the apparatus and five inches away from the film roll, measures the noise. The unwinding speed is 355 ft. per minutes and the stretch level is 250%.

For illustration purposes, a first outer layer of multilayer films disclosed herein will be referred to as the cling layer. A cling layer composition can include a blend of at least 1) one or more polyethylene elastomers and 2) one or more ultra-low density polyethylene polymers having a purge fraction greater than 20 percent as determined by the Crystallization Elution Fractionation (CEF) test method. In other embodiments, a cling layer composition can include only 1) one or more polyethylene elastomers and 2) one or more ultra-low density polyethylene polymers having a purge fraction greater than 20 percent as determined by the CEF test method.

Polyethylene Elastomer

In a cling layer, polyethylene elastomers can help provide a smooth surface to the cling layer so as to provide desired cling properties. Polyethylene (PE) elastomers can be described as thermoplastics having low crystallinity and a density less than 0.890 grams/cm$^3$. Polyethylene elastomers are described in U.S. Pat. No. 5,272,236 (Lai et al.), U.S. Pat. No. 6,486,284 (Karande et al.), U.S. Pat. No. 6,100,341 (Friedman), the entireties of which patents are incorporated herein by reference.

In some embodiments, a polyethylene elastomer component of the cling layer can include one or more olefin block copolymers. Exemplary olefin block copolymers include a copolymer of ethylene and at least one comonomer selected from the group consisting of $C_3$-$C_{20}$ α-olefins, dienes, and cycloalkenes (e.g., ethylene-butene based block copolymers, ethylene-octene based block copolymers, and the like). In some embodiments, a polyethylene elastomer component of the cling layer includes one or more a copolymers of ethylene and at least one comonomer selected from the group consisting of $C_3$-$C_{20}$ α-olefins.

The density of a polyethylene elastomer used in a cling layer can have a density less than 0.900 grams/cm$^3$. In some embodiments, a polyethylene elastomer can include a copolymer of ethylene and at least one comonomer selected from the group consisting of $C_3$-$C_{20}$ α-olefins that has a density in the range 0.855 to 0.890 grams/cm$^3$, or even in the range 0.865 to 0.890 grams/cm$^3$.

The melt index ($I_2$) of a polyethylene elastomer used in a cling layer can have a melt index of 30 grams/10 minutes or less. In some embodiments, a polyethylene elastomer has a melt index in the range of 0.1 to 30 grams/10 minutes, or even in the range 0.5 to 10 grams/10 minutes.

Exemplary polyethylene elastomers for use in a cling layer are commercially available under the tradenames AFFINITY™ from the Dow Chemical Company, ENGAGE™ from the Dow Chemical Company, INFUSE™ from the Dow Chemical Company, EXACT from ExxonMobil Chemical, and TAFMER™ from Mitsui Chemicals, Inc.

Polyethylene elastomers may be produced using single-site catalysts. Methods for producing olefin polymers using single site catalysts can be U.S. Pat. No. 5,272,236 (Lai et al.) and U.S. Pat. No. 6,486,284 (Karande et al.), the entireties of which patents are incorporated herein by reference. Single-site catalyst systems may include metallocene catalysts and post-metallocene catalysts. In exemplary embodiments, polyethylene elastomer produced by a metallocene catalyst or a post-metallocene catalyst includes a copolymer of ethylene and 5 to 25 mol percent of at least one comonomer selected from the group consisting of $C_3$-$C_{20}$ α-olefins, dienes, and cycloalkenes. In some particular embodiments, a polyethylene elastomer produced by a metallocene catalyst or a post-metallocene catalyst has a molecular weight distribution ($M_w/M_n$) of from 1.5 to 3.

The polyethylene elastomer can be incorporated into a cling layer formulation in an amount based on a variety of factors such as amounts of other ingredients (e.g., ULDPE and VLDPE), desired tack/cling; cost; tack stability during manufacturing, transportation, storage, and/or use conditions: and the like. In some embodiments, a copolymer of ethylene and at least one comonomer selected from the group consisting of $C_3$-$C_{20}$ α-olefins is present in the cling layer in an amount in the range of 90 to 10 percent by weight of the cling layer, in the range of 80 to 15 percent by weight of the cling layer, in the range of 69 to 30 percent by weight of the cling layer, or even in the range of 65 to 31 percent by weight of the cling layer.

ULDPE or VLDPE Having a Purge Fraction Greater than 20 Percent

As mentioned, a cling layer also includes at least a polyethylene polymer chosen from an ultra-low density polyethylene polymer (ULDPE), a very low density polyethylene polymer (VLDPE), and combinations thereof, and that has a purge fraction greater than 20 percent as determined by Crystallization Elution Fractionation (CEF) test method.

Purge fraction can qualitatively refer to branched (e.g., highly-branched) and non-crystallizable polyolefin copolymers that can be generated during a polymerization process via a Ziegler-Natta catalyst ("Z-N" catalyst), and become part of the final polyethylene product. As described herein, Applicants discovered that a polyethylene polymer having a purge fraction of at least 20 wt. % as determined by the CEF test method can be blended with polyethylene elastomer to provide a cling layer with desirable cling properties. As used herein, "purge fraction" can be quantified by a test method referred to herein as "Crystallization Elution Fractionation" or "CEF" test method, which is described in detail above. In some embodiments, the ULDPE or VLDPE has a purge fraction of 22 percent or greater, or even 25 percent or greater.

When incorporated into a cling layer formulation in combination with a polyethylene elastomer as described herein, ULDPE or VLDPE having a purge fraction greater than 20 percent can provide similar or even better cling in the cling layer as compared to a cling layer having a higher level of PE elastomer and no ULDPE or VLDPE polymer having a purge fraction greater than 20 percent. Reducing the amount of PE elastomer in a cling layer to provide desired cling properties can be advantageous as PE elastomer can be relatively expensive and/or can be difficult to process with blown film techniques when used at relatively high levels (e.g., greater than 90% by weight of a layer) because of its tackiness. Further, including one or more additives such as polyisobutylene (PIB) can be avoided. Not including such additives can be advantageous as such additives are sometimes subjected to a time consuming aging period so that the additive can migrate to the surface of the film (i.e., bloom); can be in liquid form and drip to an undue degree from process equipment, etc.; contaminate process equipment; cause an undue amount of noise when unrolling a roll of film; and/or cause two-sided cling when not desired.

The density of ULDPE or VLDPE used in a cling layer can have a density less than 0.920 grams/cm$^3$. In some embodiments, the ULDPE or VLDPE has a density in the range 0.885 to 0.915 grams/cm$^3$, in the range 0.885 to 0.910 grams/cm, in the range 0.890 to 0.912 grams/cm$^3$, in the range 0.895 to 0.905 grams/cm$^3$, or even in the range 0.899 to 0.905 grams/cm$^3$.

The melt index ($I_2$) of ULDPE or VLDPE used in a cling layer can have a melt index ($I_2$) in the range of 0.1 to 30 grams/10 minutes, or even in the range of 0.5 to 10 grams/10 minutes.

ULDPE and VLDPE can be incorporated into a cling layer formulation in an amount based on a variety of factors such as amounts of other ingredients (e.g., polyethylene elastomer), desired tack/cling; cost; tack stability during manufacturing, transportation, storage, and/or use conditions; and the like. In some embodiments, ULDPE or VLDPE is present in the cling layer in an amount in the range of 10 to 90 percent by weight of the cling layer, in the range of 20 to 85 percent by weight of the cling layer, in the range of 31 to 70 percent by weight of the cling layer, or even in the range of 35 to 69 percent by weight of the cling layer.

ULDPE or VLDPE can be made using Ziegler-Natta catalyst techniques to provide a desired level of purge fraction. Ziegler-Natta catalysts are described in U.S. Publication Numbers 2008/0038571 (Klitzmiller et al.) and 2008/0176981 (Biscoglio et al.), the entirety of which publications are incorporated herein by reference. An example of preparing a Ziegler-Natta catalyst and a ULDPE resin using a Ziegler-Natta catalyst technique is described in the Examples section below with respect to Sample 1 ULDPE.

In exemplary embodiments, Ziegler-Natta catalyzed ULDPE or VLDPE includes a copolymer of ethylene and 3.5 to 10.5 mol percent of at least one comonomer selected from the group consisting of $C_3$-$C_{20}$ α-olefins, dienes, and cycloalkenes. A Ziegler-Natta catalyzed ULDPE or VLDPE can have a molecular weight distribution ($M_w/M_n$) of from 3 to 6. "ULDPE" and "VLDPE" can be used interchangeably. See, e.g., U.S. Publication Number 2008/0038571 (Klitzmiller et al.), the entirety of which publication is incorporated herein by reference. In some embodiments, VLDPE can refer to such copolymer made by gas phase reaction techniques and ULDPE can refer to such copolymer made by liquid phase (solution) reaction techniques.

Exemplary ULDPE or VLDPE that can be incorporated into a cling layer are commercially available under the tradenames ATTANE™ from the Dow Chemical Company, Flexomer™ VLDPE from the Dow Chemical Company, and DOW VLDPE from the Dow Chemical Company.

An amount of the polyethylene elastomer can be combined with an amount of the ULDPE or VLDPE in any ratio that provides desired cling properties in a film. As discussed, incorporating ULDPE or VLDPE at a sufficient level can permit a lower amount of polyethylene elastomer to be included in the cling layer while still providing desired cling properties. This can be advantageous as polyethylene elastomer can be relatively more expensive than ULDPE or VLDPE and/or PE elastomer can be difficult to process with blown film techniques when used at relatively high levels (e.g., greater than 90% by weight of a layer) because of its tackiness. For example, in some embodiments, more than 30 percent by weight of the cling layer can include ULDPE or VLDPE so that less than 70 percent by weight of the cling layer includes polyethylene elastomer.

The thickness of the cling layer can vary over a wide range. In some embodiments, the cling layer is from 5-30 percent of the overall thickness of the film, or even from 10-30 percent of the overall thickness of the film.

Optionally, a cling layer can include one or more additives and/or additional materials. For example, a cling layer can optionally include low density polyethylene (LDPE) and/or linear low density polyethylene (LLDPE) as desired. Low density polyethylene can have a density in the range in the range of 0.915 to 0.935 grams/cm$^3$ and a melt index in the range of 0.1 to 30 grams/10 minutes. Linear low density polyethylene can have a density in the range in the range of 0.912 to 0.940 grams/cm$^3$ and a melt index in the range of 0.5 to 30 grams/10 minutes. In some embodiments, a cling layer can include LDPE in an amount from 0 to 30 percent by weight of the cling layer. Also, in some embodiments, a cling layer can include LLDPE in an amount from 0 to 30 percent by weight of the cling layer.

Compositions used to make a cling layer as described herein can be provided in a variety of forms.

For example, PE elastomer particles can be blended with ULDPE or VLDPE particles to form a dry blend of particles. Methods of dry blending resins can be found in U.S. Pat. No. 3,318,538 (Needham), the entirety of which patent is incorporated herein by reference. If desired, the dry blend of particles can be packaged and sold. At a point of use, the dry blend can be placed in a hopper for extrusion purposes and formed into a cling layer via, e.g., blown film techniques. In some embodiments a dry blend of particles includes a first plurality of particles and a second plurality of particles. The first plurality of particles can be made of material including a polyethylene elastomer comprising a copolymer of ethylene and at least one comonomer selected from the group consisting of $C_3$-$C_{20}$ α-olefins, wherein the copolymer of ethylene has a density in the range 0.855 to 0.890 grams/cm$^3$ and a melt index ($I_2$) in the range of 0.1 to 30 grams/10 minutes. The second plurality of particles can be made of material comprising a polyethylene polymer chosen from an ultra-low density polyethylene polymer, a very low density polyethylene polymer, and combinations thereof, wherein the polyethylene polymer has a density in the range 0.885 to 0.915 grams/cm$^3$, a melt index ($I_2$) in the range of 0.1 to 30 grams/10 minutes, and a purge fraction greater than 20 percent as determined by Crystallization Elution Fractionation (CEF) test method.

As another example, a first plurality of particles and a second plurality of particles can be melted and blended to form a mixture. In some embodiments, the first plurality of particles can be made of material including a polyethylene elastomer including a copolymer of ethylene and at least one comonomer selected from the group consisting of $C_3$-$C_{20}$ α-olefins, wherein the copolymer of ethylene has a density in the range 0.855 to 0.890 grams/cm$^3$ and a melt index ($I_2$) in the range of 0.1 to 30 grams/10 minutes. The second plurality of particles can be made of material including a polyethylene polymer chosen from an ultra-low density polyethylene polymer, a very low density polyethylene polymer, and combinations thereof, wherein the polyethylene polymer has a density in the range 0.885 to 0.915 grams/cm$^3$, a melt index ($I_2$) in the range of 0.1 to 30 grams/10 minutes, and a purge fraction greater than 20 percent as determined by Crystallization Elution Fractionation (CEF) test method. After blending the melted particles to form a mixture, the mixture can be formed into a third plurality of particles. Forming the third plurality of particles in this manner can be done by melt-blending techniques. Methods of melt blending resins can be found in U.S. Pat. No. 6,111,019 (Arjunan et al.), the entirety of which patent is incorporated herein by reference. Each particle in the third plurality of particles can include a polyethylene elastomer including a copolymer of ethylene and at least one comonomer selected from the group consisting of $C_3$-$C_{20}$ α-olefins, wherein the copolymer of ethylene has a density in the range 0.855 to 0.890 grams/cm$^3$ and a melt index ($I_2$) in the range of 0.1 to 30 grams/10 minutes; and a polyethylene polymer chosen from an ultra-low density polyethylene polymer, a very low density polyethylene polymer, and combinations thereof, wherein the polyethylene polymer has a density in the range 0.885 to 0.915 grams/cm$^3$, a melt index ($I_2$) in the range of 0.1 to 30 grams/10 minutes, and a purge fraction greater than 20 percent as determined by Crystallization Elution Fractionation (CEF) test method. If desired, the third plurality of particles can be packaged and sold. At a point of use, the third plurality of particles can be placed in a hopper for extrusion purposes and formed into a cling layer via, e.g., blown film techniques.

For illustration purposes, a second outer layer of multilayer films disclosed herein will be referred to as the release layer. Release layer composition formulations can include one or more of low density polyethylene (LDPE), linear low density polyethylene (LLDPE), polypropylene, and/or ethylene vinyl acetate (EVA). In some embodiments, a release layer can include LDPE in an amount from 0 to 100 percent by weight of the release layer. Also, in some embodiments, a release layer can include LLDPE in an amount from 0 to 100 percent by weight of the release layer. LDPE may have a density in the range in the range of 0.915 to 0.935 grams/cm$^3$ and a melt index in the range of 0.1 to 30 grams/10 minutes. LLDPE may have a density in the range of 0.912 to 0.940 grams/cm$^3$ and a melt index in the range of 0.5 to 30 grams/10 minutes. In some embodiments, the thickness of the release layer is from 10 to 30 percent of the overall thickness of the film.

Optionally, a multilayer film described herein can include one or more layers between the two outer layers (e.g., the cling outer layer and the release outer layer). Such optional layers can be directly or indirectly in contact with an outer layer. For example, a multilayer film can include a "core" layer. A core layer may be a central layer between the two outer layers. In some embodiments, a multilayer film can include a cling layer and a release layer with a single core layer between and in contact with the cling layer and the release layer.

A core layer can include one or more of LLDPE, LDPE, polyethylene elastomer, polypropylene, and/or ethylene vinyl acetate (EVA). In some embodiments, a core layer can include LLDPE in an amount from 0 to 100 percent by weight of the core layer. In some embodiments, a core layer can include LDPE in an amount from 0 to 100 percent by weight of the core layer. In some embodiments, a core layer can include polyethylene elastomer in an amount from 0 to 100 percent by weight of the core layer. In some embodiments, a core layer can include EVA in an amount from 0 to 100 percent by weight of the core layer. EVA can have a vinyl acetate content of from 1-25 wt. percent, with the remainder being ethylene. Exemplary LLDPE for use in a cling layer, core layer, and/or release layer of a multilayer film is commercially available under the tradenames ELITE™ LLDPE, TUFLIN™ LLDPE, and DOWLEX™ LLDPE from the Dow Chemical Company.

In some embodiments, the thickness of the core layer is from 40 to 80 percent of the overall thickness of the film.

The ratio of the thicknesses among a cling layer, a release layer, and any optional layers can be any ratio that provides desirable properties such as cling, release, and the like. In some embodiments, a multilayer film can have a cling layer thickness, a core layer thickness, and a release layer thickness in a ratio in the range of 1:8:1 to 3:4:3.

A multilayer film can be made by a variety of techniques such as blown film techniques. Methods of making multilayer blown films are described in U.S. Pat. No. 6,521,338 (Maka), the entirety of which patent is incorporated herein by reference. For example, a multilayer blown film can be made by co-extruding a cling layer composition and a release layer composition (and optionally a core layer composition) to form a tube having two or more layers, and blowing and then cooling the tube, by blown film co-extrusion techniques.

Multilayer films disclosed herein can have a relatively reduced noise level that may be produced as a roll of stretch wrap film unrolls as an article is being wrapped. In some embodiments, a roll of multilayer film that includes ULDPE or VLDPE having a purge fraction greater than 20 percent in the cling layer and greater than 85 wt. percent of LDPE in the release layer can produce a noise level less than or equal to 90 decibels (dB) as the roll is unwound.

Multilayer films disclosed herein can have a variety of uses such as stretch wrap films, surface protection films, agricultural films, and the like. An example of an agricultural film includes silage wrap. Silage wrap can be designed to maintain the nutritional value of forage plants such as corn, vegetables, and grasses that continue to respire after cutting. Silage wrap can exclude an undue amount of air so lactic acid fermentation can take place, leaving a feed rich in vitamins and carotene. As is common in the art, silage wrap may be used to protect feed sources for several months under a variety of conditions.

Embodiments of the multilayer films will now be further described in the following illustrative examples.

EXAMPLES

The resins used in the Examples are shown in Table 1. ENABLE™ 2010 LLDPE is available from the Exxon Mobil Chemical Company. The remaining resins in Table 1 are available from the Dow Chemical Company.

TABLE 1

| Product | Density (g/cm³) | MI (g/10 min) | Ziegler-Natta (Z-N) Purge fraction (wt. %) | Production Process | Catalyst |
|---|---|---|---|---|---|
| Resin for cling layer | | | | | |
| SAMPLE 1 ULDPE | 0.900 | 5.0 | 32 | Solution | Z-N |
| ATTANE ™ 4404 G ULDPE | 0.904 | 4.4 | 28 | Solution | Z-N |
| ATTANE ™ 4203 UDLPE | 0.905 | 0.8 | 18 | Solution | Z-N |
| DOW VLDPE 9042 VLDPE | 0.899 | 5.2 | 36 | Gas | Z-N |
| AFFINITY ™ EG 8100G PE Elastomer | 0.870 | 1.0 | Not applicable | Solution | single-site |
| Resin for core layer | | | | | |
| DOWLEX ™ 2045G LLDPE | 0.920 | 1 | 4 | Solution | Z-N |
| DOWLEX ™ 2645G LLDPE | 0.918 | 0.85 | Less than 5 | Solution | Z-N |
| DOWLEX ™ 2700G LLDPE | 0.917 | 0.95 | Less than 5 | Solution | Z-N |
| TUFLIN ™ HS-7028 NT7 LLDPE | 0.918 | 1.0 | 13 | Gas | Z-N |
| ENABLE ™ 2010 LLDPE | 0.920 | 1.0 | Not applicable | Gas | Metallocene |
| Resin for release layer | | | | | |
| LDPE 501I | 0.922 | 1.9 | none | High pressure | none |

(Note: PF = purge fraction as determined by CEF test method)

Heat of fusion of AFFINITY™ EG 8100G polyethylene elastomer by DSC is 51.7 J/g.

Sample 1 ULDPE resin was made according to the procedure below.

Preparation of the Ziegler-Natta (Z-N) Catalyst to Make Sample 1 ULDPE

The Z-N catalyst was prepared according to the following procedure. Ethylaluminium dichloride (EADC) solution (15 wt. % EADC dissolved in Isopar E (available from Exxon-Mobil Chemical Co., Houston, Tex.)) was transferred into the stirred vessel containing magnesium chloride ($MgCl_2$) slurry (0.2M in Isopar E) and aged while stirring for 6 hours prior to use. Titanium tetraisopropoxide ($Ti(OiPr)_4$) was transferred to the $MgCl_2$/EADC slurry vessel, followed by at least 8 hours of aging to obtain the procatalyst. The ratio of $MgCl_2$:EADC:$Ti(OiPr)_4$ was such that the metal ratio (Mg:Al:Ti) in the procatalyst was 40:12.5:3.

Preparation of Sample 1 ULDPE

A low-pressure, solution, polymerization reactor was used. A hydrocarbon solvent and monomer (ethylene) were injected into the reactor as a liquid. Comonomer (1-octene) was mixed with the liquid solvent. This feed stream was cooled to less than 20° C. before injection into the primary reactor. The reactors were operated at polymer concentrations in excess of 10 wt. %. The adiabatic temperature rise of the solution accounts for the heat removal from the polymerization reactions.

The solvent used in the solution polyethylene process was a high purity iso-paraffinic fraction of C6-C8 hydrocarbons. Fresh 1-octene was purified and mixed with the recycle solvent stream (contained solvent, ethylene, I-octene, and hydrogen). After mixing with the recycle stream the combined liquid stream was further purified before using a high pressure (600-1000 psig) feed pump to pump the contents to the reactor. Fresh ethylene was purified and compressed to 600-1000 psig. Hydrogen (a telogen used to reduce molecular weight) and ethylene were flow controlled into the recycle solvent stream and the total feed stream was cooled to the appropriate feed temperature, which can be <40° C. The process used the Ziegler-Natta catalyst described above to catalyze the polymerization reactions. The reactor was operated at pressures >400 psig and temperatures in excess of 70° C. The ethylene conversion was maintained in the reactor by controlling the catalyst injection rate. The residence time was relatively short (less than 30 minutes). The ethylene conversion per reaction pass was greater than 80 wt. % ethylene.

Upon exiting the reactor, water and antioxidant additives were injected in the polymer solution. The water hydrolyzed the catalyst, terminating the polymerization reaction. Some of the additives such as antioxidants remained with the polymer and function as stabilizers to prevent polymer degradation. The post reactor solution was superheated from reactor temperature (>70 Deg C.) to 210-260 Deg C. in preparation for a two-stage devolatization to recover the solvent and unreacted monomers. Residual volatiles in the polymer were less than 2,000 ppm by weight. The polymer melt was pumped to a die for underwater pellet cutting.

Example 1

TABLE 2

The Effect of Cling Layer Formulation on Stretch Cling Performance

| | | PE | ULDPE or VLDPE | | | | LLDPE | |
|---|---|---|---|---|---|---|---|---|
| Film # | Blend Density (g/cm³) | Elastomer AFFINITY ™ EG 8100G PE elastomer (wt. %) | Sample 1 ULDPE (wt. %) | ATTANE ™ 4404 ULDPE (wt. %) | Comparative ATTANE ™ 4203 ULDPE (wt. %) | DOW VLDPE 9042 VLDPE (wt. %) | Comparative DOWLEX ™ 2045G LLDPE (wt. %) | Stretch Cling (g/in film width) |
| 1 | 0.878 | 69 | 31 | 0 | 0 | 0 | 0 | 12 |
| 2 | 0.884 | 50 | 50 | 0 | 0 | 0 | 0 | 7.8 |
| 3 | 0.889 | 35 | 65 | 0 | 0 | 0 | 0 | 5.4 |

TABLE 2-continued

The Effect of Cling Layer Formulation on Stretch Cling Performance

| | | PE | ULDPE or VLDPE | | | | LLDPE | |
|---|---|---|---|---|---|---|---|---|
| Film # | Blend Density (g/cm³) | Elastomer AFFINITY™ EG 8100G PE elastomer (wt. %) | Sample 1 ULDPE (wt. %) | ATTANE™ 4404 ULDPE (wt. %) | Comparative ATTANE™ 4203 ULDPE (wt. %) | DOW VLDPE 9042 VLDPE (wt. %) | Comparative DOWLEX™ 2045G LLDPE (wt. %) | Stretch Cling (g/in film width) |
| 4 | 0.893 | 20 | 80 | 0 | 0 | 0 | 0 | 2.3 |
| 5 | 0.878 | 73 | 0 | 27 | 0 | 0 | 0 | 10.7 |
| 6 | 0.884 | 56 | 0 | 44 | 0 | 0 | 0 | 5.4 |
| 7 | 0.889 | 43 | 0 | 57 | 0 | 0 | 0 | 2.1 |
| 8 | 0.893 | 31 | 0 | 69 | 0 | 0 | 0 | 0 |
| 10 | 0.878 | 75 | 0 | 0 | 25 | 0 | 0 | 1.4 |
| 11 | 0.884 | 58 | 0 | 0 | 42 | 0 | 0 | 1.3 |
| 12 | 0.889 | 44 | 0 | 0 | 56 | 0 | 0 | 0.3 |
| 13 | 0.893 | 33 | 0 | 0 | 67 | 0 | 0 | 0 |
| 14 | 0.878 | 69 | 0 | 0 | 0 | 31 | 0 | 13 |
| 15 | 0.884 | 48 | 0 | 0 | 0 | 52 | 0 | 9.3 |
| 16 | 0.889 | 33 | 0 | 0 | 0 | 67 | 0 | 7 |
| 18 | 0.870 | 100 | 0 | 0 | 0 | 0 | 0 | 13 |
| 19 | 0.878 | 83 | 0 | 0 | 0 | 0 | 17 | 5.3 |
| 20 | 0.884 | 70 | 0 | 0 | 0 | 0 | 30 | 2.3 |
| 21 | 0.889 | 60 | 0 | 0 | 0 | 0 | 40 | 0 |
| 22 | 0.893 | 52 | 0 | 0 | 0 | 0 | 48 | 0 |
| 23 | 0.902 | 35 | 0 | 0 | 0 | 0 | 65 | 0 |
| 24 | 0.910 | 20 | 0 | 0 | 0 | 0 | 80 | 0 |

The performance data in Table 2 above of 200% stretch cling was obtained from co-extruded 3-layer films made from a blown line. The film gauge was 1 mil and the film structure was cling (15%)/core (70%)/release (15%). The core layer included 100 wt. % of DOWLEX™ 2045G LLDPE and the release layer included 100 wt. % of LDPE 501I. The composition of each cling layer was as listed in the Table 2 above.

Two sets of samples of cling layers from Table 2 were used to make FIG. 1. For one set of samples, the AFFINITY™ EG 8100G PE elastomer was blended with an ultra-low density polyethylene polymer having a purge fraction of 32 percent as determined by CEF test method (Sample 1 ULDPE) (see film #s 1-4 in Table 2). For the other set of samples, the AFFINITY™ EG 8100G PE elastomer was blended with an LLDPE having a purge fraction of 4 percent as determined by CEF test method (DOWLEX™ 2045G LLDPE) (see film #s 18-24 in Table 2). As can be seen in FIG. 1, to achieve the same or similar cling value a lower amount of AFFINITY™ EG 8100G PE elastomer can be used when blended with Sample 1 ULDPE as compared to DOWLEX™ 2045G LLDPE. The ability to use less AFFINITY™ EG 8100G PE elastomer for a given cling value can be advantageous because AFFINITY™ EG 8100G PE elastomer can be relatively expensive and/or can be difficult to process with blown film techniques when AFFINITY™ EG 8100G PE elastomer is used at relatively high levels (e.g., greater than 90% by weight of a layer) because of its tackiness. As can also be seen from FIG. 1, when the AFFINITY™ EG 8100G PE elastomer/DOWLEX 2045G LLDPE blend includes less than 70 percent AFFINITY™ EG 8100G PE elastomer, the cling value is less than 2 grams per inch film width, which can be undesirable in some embodiments. Applicants also note that for the same cling value among the two sets, especially for a cling value greater than 10 g/inch film width, it was relatively easier to perform film fabrication during blown film process for the blend of AFFINITY™ EG 8100G PE elastomer and Sample 1 ULDPE. For example, the blend of AFFINITY™ EG 81000 PE elastomer and Sample 1 ULDPE was not as tacky when the film passed over winders during film fabrication.

Example 2—Cling Performance for a Cling Layer in Contact with Different Core Layers The performance data in Table 3 below of 250% stretch cling was obtained from co-extruded 3-layer films made from a blown line. The film gauge was 0.9 mil and the structure was cling (10%)/core (80%)/release (10%). The cling layer included 69 wt. % AFFINITY™ EG 8100G PE elastomer and 31 wt. % Sample 1 ULDPE. The release layer included 100 wt. % LDPE 501I. Each film included a core layer having 100 wt. % LLDPE. The melt index and density of the LLDPE was different for each film. All films demonstrated good cling performance.

TABLE 3

| LLDPE resin in core layer | Stretch Cling (g/in film width) |
|---|---|
| DOWLEX ™ 2645G LLDPE | 13 |
| DOWLEX ™ 2700G LLDPE | 5.4 |
| TUFLIN ™ HS-7028 NT7 LLDPE | 7.4 |
| ENABLE ™ 2010 LLDPE | 10 |

Example 3

In EXAMPLES 1 and 2, the composition of the release layer was 100 wt. % LDPE. The data in Table 4 below shows the cling values of cling layers in films with different blend compositions of LDPE and LLDPE in the release layer. The cling layer composition for the films in Example 3 is fixed at 65 wt. % of AFFINITY™ EG 8100G polyethylene elastomer and 35 wt. % of Sample 1 ULDPE.

TABLE 4

| Wt. % of LDPE 501I in the release layer | Wt. % of DOWLEX ™ 2045G LLDPE in the release layer | Cling value (g/inch film width) | Noise level during film unwinding (dB, 20 inch film width) |
|---|---|---|---|
| 0 | 100 | 1.7 | 116.7 |
| 25 | 75 | 12.3 | 117.7 |
| 50 | 50 | 9.6 | 114.8 |
| 75 | 25 | 9.4 | 98.9 |
| 100 | 0 | 9.4 | 81 |

Example 4—Cold Temperature Test

The films in Table 5 were put in a freezer overnight at −5° C. The cling test was performed on each film immediately after removing each film from the freezer. The film structure was cling/core (100 wt. % DOWLEX™ 2045G LLDPE)/release (100 wt. % LDPE 501I).

TABLE 5

| Cling layer formulation | Cling value at 23° F. (g/inch film width) |
|---|---|
| 70 wt. % AFFINITY ™ EG 8100G PE elastomer + 30% DOWLEX ™ 2045G LLDPE | 6.85 |
| 50 wt. % AFFINITY ™ EG 8100G PE elastomer + 50% DOWLEX ™ 2045G LLDPE | 4.85 |

What is claimed is:

1. A multilayer film comprising:
a cling layer comprising:
   a polyethylene elastomer comprising a copolymer of ethylene and at least one comonomer selected from the group consisting of $C_3$-$C_{20}$ α-olefins, wherein the polyethylene elastomer has a density in the range 0.855 to 0.890 grams/cm$^3$ and a melt index ($I_2$) in the range of 0.1 to 30 grams/10 minutes; and
   a polyethylene polymer chosen from an ultra-low density polyethylene polymer, a very low density polyethylene polymer, and combinations thereof, wherein the polyethylene polymer has a density in the range 0.885 to 0.910 grams/cm$^3$, a melt index ($I_2$) in the range of 0.1 to 30 grams/10 minutes, and a purge fraction greater than 20 percent as determined by Crystallization Elution Fractionation (CEF) test method, wherein said polyethylene polymer is present in the cling layer in an amount from 10 to 50 percent by weight of the cling layer; and
a release layer.

2. The multilayer film according to claim 1, wherein the polyethylene polymer is present in the cling layer in an amount in the range of 10 to 35 percent by weight of the cling layer.

3. The multilayer film according to claim 2, wherein the polyethylene elastomer comprising the copolymer of ethylene and at least one comonomer selected from the group consisting of $C_3$-$C_{20}$ α-olefins is present in the cling layer in an amount in the range of 90 to 65 percent by weight of the cling layer.

4. The multilayer film according to claim 1, wherein the release layer comprises low density polyethylene and/or linear low density polyethylene.

5. The multilayer film according to claim 1, further comprising one or more layers between the cling layer and the release layer.

6. The multilayer film according to claim 1, further comprising a core layer between the cling layer and the release layer.

7. The multilayer film according to claim 1, wherein the film has a thickness and the cling layer has a thickness, and wherein the thickness of the cling layer is from 5-30 percent of the thickness of the film.

8. A method of making the multilayer film according to claim 1, wherein the method comprises:
providing a cling layer composition comprising:
   a polyethylene elastomer comprising a copolymer of ethylene and at least one comonomer selected from the group consisting of $C_3$-$C_{20}$ α-olefins, wherein the polyethylene elastomer has a density in the range 0.855 to 0.890 grams/cm$^3$ and a melt index ($I_2$) in the range of 0.1 to 30 grams/10 minutes; and
   a polyethylene polymer chosen from an ultra-low density polyethylene polymer, a very low density polyethylene polymer, and combinations thereof, wherein the polyethylene polymer has a density in the range 0.885 to 0.910 grams/cm$^3$, a melt index ($I_2$) in the range of 0.1 to 30 grams/10 minutes, and a purge fraction greater than 20 percent as determined by Crystallization Elution Fractionation (CEF) test method, wherein said polyethylene polymer is present in the cling layer in an amount from 10 to 50 percent by weight of the cling layer;
coextruding the cling layer composition with a release layer composition in an extruder to form a tube having a cling layer and a release layer; and
cooling the tube to form a multilayer blown stretch film.

* * * * *